United States Patent
Silva et al.

(10) Patent No.: US 6,870,013 B2
(45) Date of Patent: Mar. 22, 2005

(54) METHOD FOR PREPARATION OF COPOLYORGANOSILOXANECARBONATES OF HIGH CLARITY

(75) Inventors: James Manio Silva, Clifton Park, NY (US); David Michel Dardaris, Ballston Spa, NY (US); Gary Charles Davis, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/638,622

(22) Filed: Aug. 8, 2003

(65) Prior Publication Data

US 2005/0032988 A1 Feb. 10, 2005

(51) Int. Cl.$^7$ ............................................ C08G 77/04
(52) U.S. Cl. ........................ 525/464; 528/25; 528/196
(58) Field of Search ........................... 525/464; 528/25, 528/196

(56) References Cited

U.S. PATENT DOCUMENTS

| 5,530,083 A | | 6/1996 | Phelps et al. |
| 5,616,674 A | * | 4/1997 | Michel et al. ................ 528/29 |
| 6,492,481 B1 | | 12/2002 | Davis et al. |

* cited by examiner

*Primary Examiner*—Kuo-Liang Peng
(74) *Attorney, Agent, or Firm*—Andrew J. Caruso; Patrick K. Patnode

(57) ABSTRACT

Copolyorganosiloxanecarbonates are prepared by first preparing an oligomeric aromatic polycarbonate, such as an oligomeric bisphenol A polycarbonate, in the presence of a tertiary amine as the only catalyst species; contacting the oligomeric polycarbonate mixture with a polyorganosiloxane bis(aryl)chloroformate, such as the bischloroformate of hydroxy-terminated eugenol polydimethylsiloxane; and introducing phosgene and/or chain termination agent either continuously or in stages. A feature of the process is the presence of dihydroxyaromatic compound in only one charge, at the beginning. The products have excellent physical properties, including transparency.

26 Claims, No Drawings

METHOD FOR PREPARATION OF COPOLYORGANOSILOXANECARBONATES OF HIGH CLARITY

BACKGROUND OF THE INVENTION

This invention relates to the preparation of copolyorganosiloxanecarbonates, and more particularly to a method for their preparation which affords a product of high optical clarity; i.e., transparency.

Copolyorganosiloxanecarbonates, also known as siloxane-polycarbonate copolymers and hereinafter frequently designated "siloxane-PC's" for brevity, are of considerable interest since they can combine the advantageous properties of polycarbonates, including ductility, high impact resistance and transparency, with those of polyorganosiloxanes. In particular, block siloxane-PC's are characterized by good flame retardance, mold release properties and low temperature ductility.

Among the known methods for preparation of siloxane-PC's are those in which a carbonyl halide, most often phosgene, undergoes reaction with one or more dihydroxyaromatic compounds, typically 2,2-bis(4-hydroxyphenyl)propane (i.e., bisphenol A), and one or more bis(hydroxyaryl)polyorganosiloxanes. Alternatively, one or both reagents may be the corresponding bischloroformates. A frequently employed bis(hydroxyaryl)polyorganosiloxane may be prepared by the platinum-catalyzed hydrosilylation of eugenol (2-methoxy-4-allylphenol) with a bis(hydride-terminated) polydimethylsiloxane.

While such siloxane-PC's frequently have excellent properties, it is often difficult to prepare them by a method which affords a highly transparent product. The lack of transparency is evidenced by a high haze percentage in molded plaques of the siloxane-PC, and often by similarly high haze in solutions thereof. In general, haze percentages for commercially valuable polymers of this type should be no higher than about 3% for a molded plaque 3.18 mm (0.125 in) thick.

Various methods have been developed for preparation of siloxane-PC's with low haze. For example, U.S. Pat. No. 5,530,083 discloses a multiple-step method in which an oligomeric polycarbonate is prepared by phosgenating a bisphenol in the presence of a phase transfer catalyst to produce chloroformate-terminated oligomers, then condensing a bis(hydroxyaryl)polyorganosiloxane with the chloroformate in the absence of phosgene, and finally removing excess chloroformate, usually by adding an amine as catalyst.

Another method, disclosed in copending, commonly owned application Ser. No. 10/223,037, comprises the steps of, first, contacting a hydroxy-terminated polycarbonate oligomer with a siloxane bischloroformate under interfacial reaction conditions to afford a siloxane-containing polycarbonate intermediate, and, second, contacting the resulting intermediate under interfacial reaction conditions with at least one bisphenol and phosgene. Although this method is simpler than the one disclosed in the aforementioned U.S. Pat. No. 5,530,083 in that it does not require a phase transfer catalyst, it does require two charges of solid bisphenol, one for the preparation of the hydroxy-terminated polycarbonate oligomer and another in the final step, and thus has a longer than desired cycle time.

It would be desirable to produce low-haze siloxane-PC's by a method which uses easily recoverable catalysts, e.g., conventional trialkylamines, rather than phase transfer catalysts alone or in combination with trialkylamines. It would also be desirable to produce them by a method requiring no more than one addition of a solid reactant and adapted to uninterrupted phosgenation when desired, thus avoiding handling complications and extended cycle times.

SUMMARY OF THE INVENTION

The present invention affords a method for siloxane-PC preparation which is relatively simple, requires only easily recoverable catalyst materials and requires a minimum of complex handling steps.

A principal embodiment of the invention is a method for preparing a copolyorganosiloxanecarbonate which comprises:

contacting at least one dihydroxyaromatic compound with phosgene, the molar ratio of phosgene to dihydroxyaromatic compound being in the range of about 0.1–0.9:1, in an alkaline mixed aqueous-organic liquid at a pH in the range of about 9–12, in the presence of at least one trialkylamine as the only catalytic species present and, optionally, at least one monohydroxyaromatic compound or chloroformate thereof as chain termination agent, thereby producing an oligomeric aromatic polycarbonate mixture;

combining said mixture with a reagent consisting essentially of at least one polyorganosiloxane bis(aryl) chloroformate at a pH in the range of about 10.5–13.5, optionally with additional introduction of at least one of (1) phosgene and (2) at least one monohydroxyaromatic compound or chloroformate thereof as chain termination agent, thereby forming a copolyorganosiloxanecarbonate oligomer mixture; and adding phosgene and, optionally, chain termination agent to said copolyorganosiloxanecarbonate-containing mixture to afford a copolyorganosiloxanecarbonate of a desired molecular weight.

DETAILED DESCRIPTION; PREFERRED EMBODIMENTS

One of the reagents employed in the method of this invention is an oligomeric aromatic polycarbonate. The structural units in said oligomeric polycarbonate may all have the same structure or may have differing structures; i.e., the oligomeric polycarbonate is a copolycarbonate. Said structural units generally have the formula

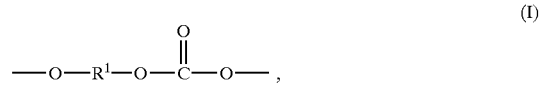

(I)

wherein $R^1$ is a divalent aromatic radical which may be an aromatic hydrocarbon or a substituted aromatic hydrocarbon radical, with illustrative substituents being alkyl, cycloalkyl, alkenyl (e.g., crosslinkable-graftable moieties such as allyl), halo (especially fluoro, chloro and/or bromo), nitro and alkoxy.

The preferred $R^1$ values have the formula

(II)

wherein each of $A^1$ and $A^2$ is a monocyclic divalent aromatic radical and Y is a single bond or a bridging radical in which one or two atoms separate $A^1$ from $A^2$. The free valence bonds in formula II are usually in the meta or para positions of $A^1$ and $A^2$ in relation to Y.

In formula II, the $A^1$ and $A^2$ values may be unsubstituted phenylene or substituted derivatives thereof wherein the substituents are as defined for R. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical such as methylene, cyclohexylmethylene, [2.2.1]bicycloheptylmethylene, ethylene, ethylidene, 2,2-propylidene, 1,1-(2,2-dimethylpropylidene), cyclohexylidene, cyclopentadecylidene, cyclododecylidene or 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

Compounds containing radicals of formula II wherein Y is a bridging radical are classed as bisphenols. Illustrative bisphenols and other dihydroxyaromatic compounds for use in the invention are listed in U.S. Pat. No. 4,737,573, the disclosure of which is incorporated by reference herein. For the sake of brevity, the term "bisphenol" will frequently be employed hereinafter, but it should be understood that other dihydroxyaromatic compounds may be substituted for all or part of the bisphenol when appropriate. Bisphenol A (in which Y is isopropylidene and $A^1$ and $A^2$ are each p-phenylene) is often especially preferred for reasons of availability and particular suitability for the purposes of the invention.

Oligomeric polycarbonates useful in the invention may be prepared by any known method for polycarbonate preparation. Included are interfacial, transesterification and redistribution methods. One often preferred method comprises contacting at least one dihydroxyaromatic compound with phosgene, the molar ratio of phosgene to dihydroxyaromatic compound being in the range of about 0.1–0.9:1, preferably about 0.3–0.85:1 and most preferably about 0.5–0.8:1, in an alkaline mixed aqueous-organic liquid at a pH in the range of about 9–11, in the presence of at least one trialkylamine as the only catalytic species present and, optionally, at least one monohydroxyaromatic compound or chloroformate thereof as chain termination agent. This method is the first step in an alternative embodiment of the invention.

Illustrative organic liquids which may be used in oligomer preparation are aliphatic hydrocarbons such as n-hexane and n-heptane; chlorinated aliphatic hydrocarbons such as methylene chloride, chloroform, carbon tetrachloride, dichloroethane, trichloroethane, tetrachloroethane, dichloropropane and 1,2-dichloroethylene; aromatic hydrocarbons such as benzene, toluene and xylene; substituted aromatic hydrocarbons such as chlorobenzene, o-dichlorobenzene, the chlorotoluenes, nitrobenzene and acetophenone; and carbon disulfide. The chlorinated aliphatic hydrocarbons, especially methylene chloride, are preferred.

The catalyst is a tertiary amine, typically a trialkylamine such as triethylamine or a highly nucleophilic heterocyclic amine such as 4-dimethylaminomorpholine. Triethylamine is preferred. Tertiary amine mixtures may also be employed.

The oligomer-forming reaction is generally conducted at a temperature in the range of about 15–50° C. The pH of the aqueous phase of the reaction mixture is maintained in the range of about 9–12 by introduction of a suitable base, most often an alkali metal hydroxide and preferably sodium hydroxide.

A monohydroxyaromatic compound or chloroformate thereof may be present as a chain termination agent in the oligomer preparation method. Illustrative chain termination agents are phenol, p-cumylphenol and their chloroformates.

For oligomer preparation, the molar ratio of phosgene to bisphenol is conveniently maintained in the range of about 0.1–0.9:1. For preparation of a transparent product, a molar ratio of about 0.3–0.85:1 and preferably about 0.5–0.8:1 is suitable. The pH of the aqueous phase of the reaction mixture is maintained in the range of about 9–11. Tertiary amine proportions are typically in the range of about 0.05–2.0 mole percent based on bisphenol. The oligomer concentration is in the range of about 5–30% by weight, based on oligomer plus solvent. Chain termination agent, if present, may be in an amount up to about 10 mole percent based on bisphenol. As noted hereinafter, however, introduction of chain termination agent at various stages of the process is contemplated and the amount present for oligomer preparation, if any, may be substantially less than the total to be employed overall.

Molecular weights (weight average relative to polystyrene, measured by gel permeation chromatography, whenever used herein in any context) for the oligomeric polycarbonates employed according to the invention are not critical. However, they will, of course, be lower than the corresponding molecular weights of commercial polycarbonates. For the most part, illustrative molecular weights may be in the range of about 1,000–8,000.

An important feature of the method of the invention is the ability to achieve a low haze product using only one charge of bisphenol, which in most instances is in the form of a solid and is therefore difficult to meter into the reaction mixture on a continuous or semi-continuous basis. Thus, in the preferred embodiment of the invention all the bisphenol employed in the process is furnished by the oligomeric polycarbonate. Other reagents may be supplied at various stages of the process, but the bisphenol-derived reagent is present in its entirety at the beginning.

In an alternative embodiment of the invention, a minor proportion of total bisphenol, generally up to about 10% by weight of the total amount, may be introduced at one or more than one point subsequent to initial introduction thereof. The point or points of such introduction may be anywhere from immediately after initial bisphenol introduction to after siloxane-BCF (as defined hereinafter) introduction. A major purpose of later introduction of bisphenol is frequently to accommodate various process streams, particularly in a continuous reaction scheme.

The oligomeric polycarbonate is then combined with a reagent consisting essentially of at least one polyorganosiloxane bis(aryl)chloroformate, hereinafter sometimes designated "siloxane-BCF" for brevity. The siloxane-BCF may be all or part of a previously synthesized batch or may be prepared as needed on a just-in-time basis. Particularly in the latter event, it need not be isolated or stored and may be employed in the form in which it was prepared.

Typical siloxane-BCF's have the formula (III)

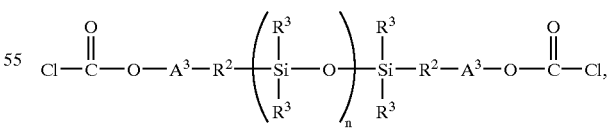

wherein:

$A^3$ is an unsubstituted or substituted divalent aromatic radical, $R^2$ is a $C_{2-8}$ divalent aliphatic radical, each $R^3$ is independently a $C_{1-13}$ organic radical, and n is from 1 to 1,000.

Illustrative $A^3$ radicals are 1,4-phenylene, 1,3-phenylene, 2-methyl-1,4-phenylene and 2-methoxy-1,4-phenylene which is often preferred by reason of the fact that eugenol is a readily available and thus preferred reactant for preparation of the siloxane-BCF. For the same reason, $R^2$ is often preferably 1,3-propylene, but other illustrative radicals are ethylene, 1,2-propylene and 1,4-butylene.

The $R^3$ radicals may be aliphatic or aromatic and may contain substituents, usually halogen and especially fluorine. Illustrative $R^3$ radicals are methyl, phenyl and 3,3,3-trifluoropropyl; methyl is usually preferred.

As previously mentioned, a siloxane-BCF which is often preferred may be prepared by platinum-catalyzed hydrosilylation of eugenol with a hydrogen-terminated polydimethylsiloxane, followed by phosgenation; the phosgenation step may be efficiently conducted in a tube reactor. This siloxane-BCF is sometimes hereinafter designated "EuBCF". $A^3$ therein is 2-methoxy-1,4-phenylene with the methoxy group ortho to the oxygen atom, $R^2$ is trimethylene, each $R^3$ is methyl and n most often has an average value in the range of about 10–100, preferably about 25–75 and most preferably about 30–60. Most often, the proportion of chloroformate end groups in the siloxane-BCF, as a percentage of total end groups, is at least about 90%.

Combination of the oligomeric polycarbonate with the siloxane-BCF is generally achieved by adding the siloxane-BCF, usually in solution in an organic liquid such as those previously identified, to the aqueous-organic mixture containing the oligomeric polycarbonate in the form of either a crude reaction mixture or a purified product, while maintaining the pH of the aqueous phase in the range of about 10.5–13.5 which may be maintained by addition of aqueous base as necessary.

The proportion of siloxane-BCF relative to oligomeric polycarbonate is subject to wide variation. In its broadest sense, the ratio of equivalents of oligomer hydroxide to bischloroformate, i.e., the ratio of hydroxide groups to chloroformate groups, is greater than 1:1. It is preferably at least about 4:1 and more preferably at least about 10:1. It may often be as high as about 3,000:1. To obtain a transparent product, it is generally advisable to maintain the proportion of organosiloxane units in the range of about 0.1–30.0% by weight and the value of n in the range of about 5–60.

It is within the scope of the invention to continue phosgenation of the reaction mixture and/or addition of chain termination agent during addition of the siloxane-BCF. An alternative embodiment involves interrupted phosgenation, the initial stage being during the preparation of the oligomeric aromatic polycarbonate and the subsequent stage beginning after some or all of the siloxane-BCF has been charged, with an optional delay after all of the siloxane-BCF has been introduced, said delay, when employed preferably being in the range of about 1–5 minutes. Similarly, the chain termination agent may be added in full or in part prior to or during oligomeric aromatic polycarbonate preparation or divided between such preparation and later steps. Thus, addition of both of these reagents may be continuous or performed on a programmed schedule throughout the steps of oligomeric polycarbonate and siloxane-PC oligomer preparation.

In a final step, phosgene and, optionally, chain termination agent are introduced to afford a product of a desired molecular weight. This step is most often conducted at a pH in the range of about 9.5–11.5, preferably about 10–11. Any desired molecular weight may be achieved in this step, with weight average values in the range of about 20,000–100,000 being typical.

The siloxane-PC prepared by the method of this invention may be isolated by conventional means; for example, by anti-solvent precipitation followed by vacuum drying. As thus obtained, the product may be molded into articles having high transparency and other excellent properties.

The method of this invention is capable of affording siloxane-PC's which can be molded into articles of high transparency, as evidenced by a low percentage of haze in molded plaques. Solution haze measurements are also of some significance in evaluating transparency of molded articles. For the most part, however, solution and plaque haze only correspond to the extent that low solution haze will accompany low plaque haze. High solution haze may not be an indicator that plaque haze will also be high. Thus, any solution haze value below about 50%, or even higher in some instances, may pair up with a suitably low plaque haze. In general, plaque haze values below about 4% and especially below about 2% are excellent for the purposes of the invention.

While the siloxane-PC's of the invention are by their very nature block copolymers, in which organosiloxane blocks alternate with carbonate blocks, it is believed to be important from the standpoint of transparency for the distribution of organosiloxane blocks to be as random as possible. The invention is advantageous in that it appears to afford siloxane-PC's that have a significant degree of randomness.

The invention is illustrated by the following examples. All parts and percentages are by weight. Molecular weights are weight average and were determined by gel permeation chromatography relative to polystyrene. Haze measurements utilized a BYK Gardner Haze-Gard Plus instrument. Plaque haze measurements were made on ASTM 3.18 mm (⅛ in) plaques; solution haze was measured on samples contained in a solution cell 1 cm in thickness and wide enough to completely cover the 25 mm (diameter) circular light port of the instrument, said samples containing 15% (by weight) siloxane-PC dissolved in methylene chloride.

Batches of EuBCF solution employed in the examples were prepared by feeding a tubular reactor with a 20% solution of eugenol-capped polydimethylsiloxane in $CH_2Cl_2$, aqueous NaOH, and $COCl_2$. They were shown by analysis to be almost 100% bischloroformate and had no detectable carbonate.

EXAMPLES 1–3

The reaction vessel was a 2-liter glass reactor equipped with two identical six-blade impellers, a recirculation loop, a reflux condenser, a phosgene inlet tube, an inlet tube for the introduction of aqueous sodium hydroxide and a pH probe. The pH probe was connected to a feedback mechanism controlling the amount of sodium hydroxide solution added as a function of reaction mixture pH.

The reactor was charged with 630 ml of methylene chloride, 525 ml of deionized water, 140 g of bisphenol A, 1.55 ml of triethylamine and various amounts of 50% aqueous sodium hydroxide solution. Phosgene was added at 0.049 mole per minute per mole of bisphenol A to a molar ratio to bisphenol A (hereinafter "phosgene ratio") of 1.0, 0.033 from 1.0 to 1.1 and 0.0165 from 1.1 to the final phosgene ratio of 1.2. During phosgenation, an exotherm occurred which caused the temperature to rise to reflux.

During the first increment of phosgene addition, sodium hydroxide solution was added in a fixed molar ratio to the phosgene addition of 2:1, resulting in a pH of about 11.5. Then the pH was adjusted to 12.12 by introduction of sodium hydroxide solution and EuBCF (having an average of 48 siloxane units) in various amounts, as a 22.64% solids solution in methylene chloride, was added over various periods while maintaining the pH in the range of 12.0–12.1.

Three minutes after the end of EuBCF addition, the organic phase was sampled and tested negative for chloroformates. Then 7.16 g of p-cumylphenol (5.5 mole percent based on bisphenol A) was added to the reactor. An additional portion of phosgene was introduced, with maintenance of the pH at 10.5.

After the phosgenation was complete, the pH was maintained at 10.5 for 1 minute, and then the product was drained from the reactor. The aqueous phase was discarded and the organic phase was washed twice with 1N aqueous hydrochloric acid solution and three times with deionized water. The product was then isolated by precipitation into deionized water.

EXAMPLES 4–5

The procedure was similar to that of Examples 1–3, except as follows. No aqueous sodium hydroxide was present in the initial charge; instead, it was added as needed during the first phosgenation operation to maintain the pH at 10.5. The phosgene ratios at the end of the first phosgene charge were 0.75 in Example 4 and 0.85 in Example 5.

EXAMPLE 6

The procedure of Example 4 was repeated in a 30-1 reactor, employing 2,280 g of bisphenol A and other reagents in proportion, with subsurface delivery of EuBCF.

EXAMPLES 7–8

The procedures of Examples 4–5 were repeated, except that the p-cumylphenol was present in the initial charge.

EXAMPLES 9–10

The procedures of Examples 4 and 1 were repeated, except as follows. Phosgenation was uninterrupted during the entire process. The chain termination agent was phenyl chloroformate, which was present in the initial charge. Two values for oligomer phosgene ratio are given, one at the beginning and the other at the end of EuBCF addition.

The reaction parameters and results for Examples 1–10 are given in Table I, in comparison with five controls. Controls 1–4 were prepared using the method disclosed in Ser. No. 10/223,037, employing two equal charges of bisphenol A. For these controls, the oligomer phosgene ratio is the moles of phosgene added in the first charge per mole BPA in the first charge. Control 5 is a laboratory-prepared bisphenol a polycarbonate.

seen that even products with high solution haze can have adequately low plaque haze. Comparison with Control 5 shows that the products of the invention compare not unfavorably with bisphenol A polycarbonate, known for its transparency.

EXAMPLE 11

The reactor of Example 6 was charged with 2280 g of bisphenol A, 10.25 l of methylene chloride, 8.5 l of deionized water, 116.6 g of p-cumylphenol and 25.3 ml of triethylamine. The pH was adjusted to 10.5 by addition of 10 ml of 50% aqueous sodium hydroxide solution. Phosgene was added at about 26 g/min throughout the reaction, without interruption. Additional sodium hydroxide solution was added to maintain the pH at 10.5 until the phosgene ratio was 0.28, at which point additional sodium hydroxide solution was introduced until a phosgene ratio of 0.53 was reached, at a pH of 11.9.

A 20% solution of EuBCF (having an average of 41 siloxane units) in methylene chloride was charged under the surface of the reaction mixture over 205 seconds, with maintenance of the pH in the range of 11.9–12.2. Phosgenation was continued with no further addition of base until the phosgene ratio reached 0.87, after which base was added as needed to maintain the pH at 10.5. When a phosgene ratio of 1.2 had been reached, the phosgene was shut off.

The organic phase was washed twice with 1N aqueous hydrochloric acid solution and three times with deionized water. A portion of the siloxane-PC solution was precipitated into hot deionized water and dried in a vacuum oven overnight. The solution haze was 1.49% and the siloxane level was 4.52%. The balance of the solution was precipitated into methanol, dried for 16 hours at 105° C. in a vacuum and molded into a plaque which had a plaque haze of 1.7%.

EXAMPLE 12

The procedure of Example 11 was repeated except as follows. Phosgene was added at about 22–12 g/min; initially the rate was 22 g/min, but the rate declined steadily throughout the phosgenation to a final value of 12.4 g/min. At a phosgene ratio of 0.40, the pH was raised to 12. At a

TABLE I

| Example | Initial NaOH, g | Phosgene, first charge, g | Phosgene, second charge, g | EuBCF addition time, sec | Oligomer phosgene ratio | Oligomer MW | Product MW | Siloxane, % | Solution haze, % | Plaque haze, % |
|---|---|---|---|---|---|---|---|---|---|---|
| 1 | 59.33 | 20 | 52.88 | 122 | 0.33 | 5,900 | 37,380 | 4.55 | 77.8 | — |
| 2 | 46.60 | 25 | 47.88 | 122 | 0.41 | 3,150 | 34,950 | 4.52 | 54.0 | — |
| 3 | 31.86 | 33 | 39.88 | 117 | 0.54 | 2,150 | 34,580 | 4.59 | 7.93 | — |
| 4 | 0 | 45.55 | 27.30 | 120 | 0.75 | 2,970 | 35,510 | 4.49 | 4.23 | — |
| 5 | 0 | 51.62 | 21.20 | 120 | 0.85 | 6,160 | 38,350 | 4.42 | 99 | — |
| 6 | 0 | 841 | 345 | 120 | 0.75 | 2,730 | 37,390 | 4.27 | 99 | 3.35 |
| 7 | 0 | 45.55 | 27.30 | 120 | 0.75 | 2,290 | 36,920 | 4.59 | 4.31 | — |
| 8 | 0 | 51.62 | 21.20 | 120 | 0.85 | 3,190 | 39,220 | 4.53 | 22.0 | — |
| 9 | 0 | 72.85 | — | 206 | 0.33–0.50 | — | 36,550 | 4.23 | 11.5 | — |
| 10 | 59.33 | 72.88 | — | 206 | 0.33–0.50 | — | 42,370 | 4.12 | 16.0 | — |
| Control 1 | — | 22.76 | 50.09 | 110 | 0.75 | 2,790 | 34,240 | 4.32 | 3.26 | — |
| Control 2 | — | 22.76 | 50.09 | 122 | 0.75 | 2,930 | 35,400 | 4.27 | 2.14 | — |
| Control 3 | — | 371 | 815 | 187 | 0.75 | 3,140 | 33,110 | 4.81 | 1.70 | 1.70 |
| Control 4 | — | 25.80 | 47.05 | 124 | 0.85 | 2,560 | 36,300 | 4.56 | 3.96 | — |
| Control 5 | — | — | — | — | — | — | 35,100 | — | 1.58 | — |

Examples 1–10 demonstrate the effectiveness of the method of the invention for the preparation of siloxane-PC's. A comparison of Example 6 with Control 3 shows that said method affords products with adequately low plaque haze percentages. From a comparison of solution haze with plaque haze, referring particularly to Example 6, it will be phosgene ratio of 0.51, the pH meter indicated 11.6 and EuBCF was charged into the headspace of the reactor over 244 seconds; the pH during EuBCF addition was maintained in the range of 11.6–12.0. The phosgene ratio was 0.58 by the end of EuBCF addition. Base addition was continued to maintain the pH at 12 for two minutes. At this point the phosgene ratio was 0.616 and the pH was lowered to 10.5. No additional base was added until the phosgene ratio reached 0.913; from that point, base was added as needed to maintain a pH of 10.5. When the phosgene ratio reached 1.2, the phosgene was shut off. Upon workup as in Example 11, a siloxane-PC was obtained having a siloxane level of 6.34%, a solution haze of 1.00% and a plaque haze of 1.83%.

EXAMPLES 13–15

EuBCF (having an average of 41 siloxane units) as a 20% solution in methylene chloride was prepared on a commercial scale in a tubular reactor and delivered as required to a 1135-1 agitated reactor vessel equipped with condensers, recirculation loop for pH measurement and means for introducing phosgene, sodium hydroxide solution, and the EuBCF.

The reactor was charged with 90.7 kg of bisphenol A, methylene chloride and water in proportions to afford the listed solids percentages (i.e., percentage of product in the methylene chloride solution) and p-cumylphenol and triethylamine in proportions relative to bisphenol A similar to those in Examples 1–12. Just prior to phosgenation, the reactor was charged with 2.72 kg of 50% aqueous sodium hydroxide solution. Then phosgene was added at 68–136 kg/hr, and 50% aqueous sodium hydroxide solution was added to maintain the pH at 10.0. Phosgene was added at a substantially constant rate until 47.2 kg had been added. At a phosgene ratio of 0.5, the pH was increased to a value in the range of 10.8–11.2. This pH was maintained to a phosgene ratio of 0.8, whereupon the pH was returned to 10.0 for the duration of the phosgenation.

When a phosgene ratio of about 0.6 had been attained, the tubular reactor was activated and operated until the desired amount of EuBCF had been introduced. Then the tubular reactor was stopped. The phosgenation was continued until the desired phosgene ratio was reached, after which the products were worked up as described in Example 11.

The reaction parameters and product properties of Examples 13–15 are given in Table II. "Initial" and "final" phosgene ratios are relative to EuBCF introduction.

TABLE II

| Example | Phosgene addition rate, kg/hr | % Solids | pH | Phosgene ratio, initial | Phosgene ratio, final | Siloxane, % | Product MW | Solution haze, % | Plaque haze, % |
|---|---|---|---|---|---|---|---|---|---|
| 13 | 68 | 14.9 | 10.8–11.2 | 0.62 | 0.72 | 5.37 | 39,400 | 5.35 | 1.7 |
| 14 | 136 | 15.8 | 10.8 | 0.58 | 0.80 | 6.2 | 38,600 | 3.57 | 3.2 |
| 15 | 136 | 18.2 | 10.8 | 0.59 | 0.81 | 6.1 | 39,600 | 12.9 | 1.7 |

It can be seen that the plaque haze levels of the products of Examples 13–15 are comparable with those of other siloxane-PC's prepared by less convenient methods.

While typical embodiments have been set forth for the purpose of illustration, the foregoing descriptions and examples should not be deemed to be a limitation on the scope of the invention. Accordingly, various modifications, adaptations, and alternatives may occur to one skilled in the art without departing from the spirit and scope of the present invention.

What is claimed is:

1. A method for preparing a copolyorganosiloxanecarbonate which comprises:

contacting at least one dihydroxyaromnatic compound with phosgene, the molar ratio of phosgene to dihydroxyaromatic compound being in the range of about 0.3–0.85:1, in an alkaline mixed aqueous-organic liquid at a pH in the range of about 9–12, in the presence of at least one tertiary amine as the only catalytic species present and, optionally, at least one monohydroxyaromatic compound or chloroformate thereof as chain termination agent, thereby producing an oligomeric aromatic polycarbonate mixture;

combining said mixture with a reagent consisting essentially of at least one polyorganosiloxane bis(aryl) chloroformate at a pH in the range of about 10.5–13.5, optionally with additional introduction of at least one of (1) phosgene and (2) at least one monohydroxyaromatic compound or chloroformate thereof as chain termination agent, thereby forming a copolyorganosiloxanecarbonate oligomer mixture; and adding phosgene and, optionally, chain termination agent to said copolyorganosiloxanecarbonate-containing mixture to afford a copolyorganosiloxanecarbonate of a desired molecular weight.

2. A method according to claim 1 wherein the oligomeric aromatic polycarbonate comprises structural units of the formula

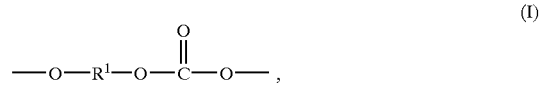

wherein R1 is a divalent aromatic radical.

3. A method according to claim 2 wherein $R^1$ has the formula

wherein each of $A^1$ and $A^2$ is a monocyclic divalent aromatic radical and Y is a single bond or a bridging radical in which one or two atoms separate $A^1$ from $A^2$.

4. A method according to claim 3 wherein the oligomeric aromatic polycarbonate is a bisphenol A polycarbonate.

5. A method according to claim 1 wherein the polyorganosiloxane bis(aryl)chloroformate has the formula

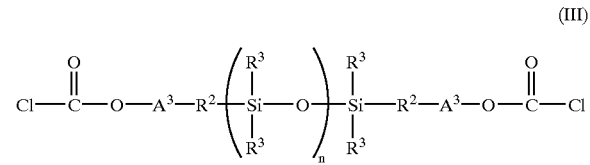

wherein:

$A^3$ is an unsubstituted or substituted divalent aromatic radical, $R^2$ is a $C_{2-8}$ divalent aliphatic radical, each $R^3$ is independently a $C_{1-13}$ organic radical, and n is from 1 to 1,000.

6. A method according to claim 5 wherein $A^3$ is 2-methoxy-1,4-phenylene with the methoxy group ortho to the oxygen atom, $R^2$ is trimethylene, each $R^3$ is methyl and n has in average value in the range of about 10–100.

7. A method according to claim 6 wherein n has an average value in the range of about 30–60.

8. A method according to claim 6 wherein the proportion of chloroformate end groups in the polyorganosiloxane bis(aryl)chloroformate, as a percentage of total end groups, is at least about 90%.

9. A method according to claim 6 wherein the polyorganosiloxane bis(aryl)chloroformate is in the form of a crude reaction mixture in solution in an organic liquid.

10. A method according to claim 1 wherein the ratio of hydroxide groups to chloroformate groups is at least about 4:1.

11. A method according to claim 10 wherein the ratio of hydroxide groups to chloroformate groups is from about 10:1 to about 3,000:1.

12. A method according to claim 1 wherein the polyorganosiloxane bis(aryl)chloroformate is added to the oligomeric aromatic polycarbonate.

13. A method according to claim 1 wherein the organic liquid is methylene chloride.

14. A method according to claim 1 wherein the tertiary amine is triethyl amine.

15. A method according to claim 1 wherein pH is controlled by addition of aqueous sodium hydroxide solution.

16. A method according to claim 1 wherein the chain termination agent is phenol, p-cumylphenol or a chloroformate thereof.

17. A method according to claim 1 wherein phosgene is introduced throughout the process.

18. A method according to claim 1 wherein phosgene is introduced during oligomeric aromatic polycarbonate preparation and after addition of the polyorganosiloxane bis(aryl)chloroformate.

19. A method according to claim 1 wherein chain termination agent is introduced throughout the process.

20. A method according to claim 1 wherein chain termination agent is introduced during oligomeric aromatic polycarbonate preparation and after addition of the polyorganosiloxane bis(aryl)chloroformate.

21. A method for preparing a copolyorganosiloxanecarbonate which comprises:

contacting bisphenol A with phosgene, the molar ratio of phosgene to bisphenol A being in the range of about 0.30–0.85:1, in an alkaline mixed aqueous-methylene chloride liquid at a pH in the range of about 9–12, in the presence triethylamine as the only catalytic species present and, optionally, at least one of phenol, p-cumylphenol and chloroformates thereof as chain termination agent, thereby producing an oligomeric aromatic polycarbonate mixture;

combining said mixture with a reagent consisting essentially of at least one polyorganosiloxane bis(aryl) chloroformate having the formula (III)

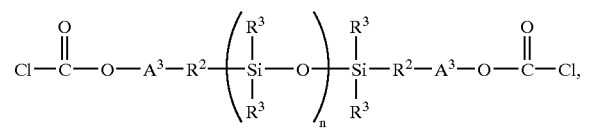

wherein $A^3$ is 2-methoxy-1,4-phenylene with the methoxy group ortho to the oxygen atom, $R^2$ is trimethylene, each $R^3$ is methyl and n has an average value in the range of about 5–60, with an oligomeric bisphenol A polycarbonate in a mixed aqueous-methylene chloride liquid and in the presence of triethylamine as the only catalytic species, at a pH in the range of about 10.5–13.5, optionally with additional introduction of at least one of phosgene and phenol, p-cumylphenol or a chloroformate thereof as chain termination agent, the ratio of hydroxide groups to chloroformate groups being from about 10:1 to about 3,000:1 and the proportion of said polyorganosiloxane bis(aryl) chloroformate being such as to yield a product containing about 0.1–30.0% by weight organosiloxane units, thereby forming a copolyorganosiloxanecarbonate oligomer mixture; and adding phosgene and, optionally, chain termination agent to said copolyorganosiloxanecarbonate-containing mixture to afford a copolyorganosiloxanecarbonate of a desired molecular weight.

22. A method according to claim 21 wherein phosgene is introduced throughout the process.

23. A method according to claim 21 wherein phosgene is introduced during oligomeric aromatic polycarbonate preparation and after addition of the polyorganosiloxane bis(aryl) chloroformate.

24. A method according to claim 21 wherein chain termination agent is introduced throughout the process.

25. A method according to claim 21 wherein chain termination agent is introduced during oligomeric aromatic polycarbonate preparation and after addition of the polyorganosiloxane bis(aryl)chloroformate.

26. A method for preparing a copolyorganosiloxanecarbonate which comprises:

contacting at least one dihydroxyaromatic compound with phosgene, the molar ratio of phosgene to dihydroxyaromatic compound being in the range of about 0.3–0.85:1, in an alkaline mixed aqueous-organic liquid at a pH in the range of about 9–12, in the presence of at least one trialkylamine as the only catalytic species present and, optionally, at least one monohydroxyaromatic compound or chloroformate thereof as chain termination agent, the amount of dihydroxyaromatic compound being at least about 90% by weight of the total to be employed, thereby producing an oligomeric aromatic polycarbonate mixture;

combining said mixture with a reagent consisting essentially of at least one polyorganosiloxane bis(aryl) chloroformate at a pH in the range of about 10.5–13.5, optionally with additional introduction of at least one of (1) phosgene and (2) at least one monohydroxyaromatic compound or chloroformate thereof as chain termination agent, thereby forming a copolyorganosiloxanecarbonate oligomer mixture;

introducing the balance, up to about 10% by weight, of said dihydroxyaromatic compound at one or more than one point subsequent to said initial introduction thereof; and adding phosgene and, optionally, chain termination agent to said copolyorganosiloxanecarbonate-containing mixture to afford a copolyorganosiloxanecarbonate of a desired molecular weight.

* * * * *